United States Patent Office 3,513,165
Patented May 19, 1970

3,513,165
5-NITRO-FURFURAL PIPERAZINEALKANOYL HYDRAZONES AND METHOD OF PREPARATION
Elena Massarani, Dante Nardi, and Ludwig Degen, Milan, Italy, assignors to Societe d'Exploitations Chimiques et Pharmaceutiques Seceph S.A., Lugano, Switzerland
No Drawing. Filed Aug. 29, 1968, Ser. No. 756,290
Claims priority, application Switzerland, Sept. 11, 1967, 12,647/67
Int. Cl. C07d 51/70
U.S. Cl. 260—240                        3 Claims

ABSTRACT OF THE DISCLOSURE

Novel 5-nitro-furfural piperazinealkanoylhydrazones having antibacterial activity are prepared by condensing hydrazones with 5-nitro-furfural and a carboxylic acid of the formula

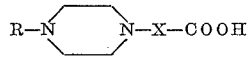

or by reacting an alcohol with a compound of the formula

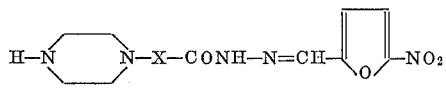

The object of the present invention is new 5-nitro-furfural piperazinealkanoylhydrazones of the formula:

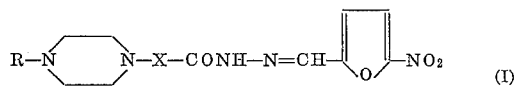     (I)

in which R is hydrogen or an alkyl or alkenyl radical having 1 to 12 carbon atoms which is unsubstituted or substituted by at least one hydroxyl or aryl group, an aryl radical, an acyl radical or a dialkyl carbamoyl radical, and X is an alkylene radical having one or two carbon atoms, as well as their acid addition salts.

These compounds have an antibacterial activity on gram-positive bacteria, gram-negative bacteria and the mycobacterium tuberculosis.

The compounds in which R is in an alkyl radical having 1 to 4 carbon atoms, a phenyl radical, a benzyl radical, an acetyl radical or an N-diethyl carbamoyl radical and X is a methylene radical, ethylene or ethylidene radical, as well as their acid addition salts, are particularly active.

In accordance with the invention, the compounds of Formula I are prepared by condensing hydrazine, on the one hand, with 5-nitro-furfural and, on the other hand, with a carboxylic acid of the formula:

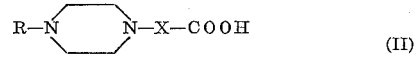     (II)

or a functional derivative thereof, preferably a lower alkyl ester such as the ethyl ester.

In one particular embodiment of this process, the ethyl ester of the carboxylic acid of Formula II is first of all condensed with hydrazine hydrate in a slight excess in the presence of ethanol as solvent. Thereupon the hydrazide thus obtained is condsensed with an equimolecular quantity of 5-nitro-furfural dissolved in acetic acid. The desired product is thus obtained in the form of the diacetate from which the base can be liberated by treatment with a basic agent such as sodium carbonate.

The ethyl ester of the carboxylic acid of Formula II can be prepared by reaction of a compound of formula Cl—X—COOC$_2$H$_5$ with a piperazine of formula:

     (III)

The ethyl esters of the acids of Formula II, with the exception of those in which R is hydrogen or an alkanoyl or dialkyl carbamoyl radical, are also prepared by reacting a sulfonic ester of the alcohol of formula R—OH with a compound of formula:

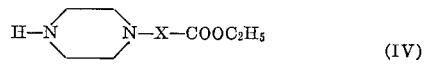     (IV)

As the sulfonic acid ester, p-toluene sulfonic acid ester is advantageously employed. The two starting materials are preferably employed in equimolecular quantities and reacted in the presence of an alkaline agent such as sodium or potassium carbonate in solution in an alcohol of formula R—OH. The reaction time is of the order of 20 hours at 100° C.

In accordance with the invention, the same reaction is used to introduce the radical R into a compound of formula:

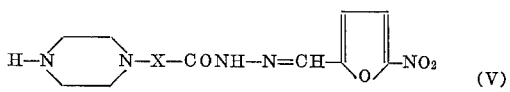     (V)

for obtaining the 5-nitro-furfural piperazinealkanoyl hydrazones of Formula I, with the exception of those in which R is hydrogen or an alkanoyl radical or dialkyl carbamoyl radical.

EXAMPLE 1

(1) 4-methyl-piperazineacetohydrazide

A mixture of 186 g. (1 mol) of ethyl 4-methyl-piperazineacetate, 52.5 g. (1.05 mol) of hydrazine hydrate and 200 cc. of ethyl alcohol is heated under reflux for 12 hours.

Thereupon, the solvent is evaporated under reduced pressure to constant weight. There is obtained a solid white residue which can be used directly for the subsequent condensation with the 5-nirto-furfural. The yield is a theoretical yield. The product can be purified by distilling it under vacuum and collecting the fraction of 125–120° C./0.2 mm. Hg (yield 75%). This substance crystallizes in ligroin with a melting points of 87–89° C. It is soluble in water, methanol, ethanol, chloroform and benzene and practically insoluble in ethyl ether. For C$_7$H$_{16}$N$_4$O (mol. wt. 172.23).—Calculated (percent): C, 48.81; H, 9.36; N, 32.53. Found (percent): C, 49.06; H, 9.48; N, 32.50.

There remains in the distillation flask a tailing crystallizable in ethyl acetate (M.P. 113° C.), identified as being the bis-1,2-(4'-methyl-piperazineacetyl)-hydrazine of formula:

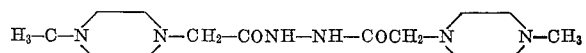

This substance is soluble in water, methanol, ethanol, and chloroform and is slightly soluble in ethyl ether and benzene. For C$_{14}$H$_{28}$N$_6$O$_2$ (mol wt. 312,415).—Calculated (percent): C, 53.82; H, 9.03; N, 26.90. Found (percent): C, 53.33; H, 9.16; N, 27.09.

As this by-product is formed primarily during the distillation, it is preferable to use the crude reaction product for the subsequent condensation.

The initial ethyl-4-methyl-piperazineacetate can be prepared in the following manner:

0.1 mol of N-methyl-piperazine dihydrochloride is dissolved in 16 cc. of water, whereupon 50 cc. of acetone or of ethanol and 27.72 g. (0.33 mol.) of sodium bicarbonate are added. The mixture is stirred for ¼ hour, whereupon 0.1 mol of ethyl chloroacetate is added to it drop by drop. A slightly exothermal reaction is observed. Heating is effected under reflux for two hours, whereupon filtration of the hot material is effected to eliminate the inorganic salt, and the solvent is then evaporated under vacuum and the residue distilled.

(2) 5-nitrofurfural 4'-methyl-piperazineacethydrazone 172 g. (1 mol) of 4-methyl-piperazinoacethydrazide are dissolved in 200 cc. of acetic acid and cooled to 20° C. With agitation, 141 g. (1 mol) of 5-nitro-furfural dissolved in 100 cc. of acetic acid, are added. The mixture is stirred at 40° C. for 1½ hours and then poured into 3000 cc. of ethyl acetate; 10 g. of bleaching carbon are added, followed by filtration. Upon cooling, a yellow product crystallizes out. It is set aside for 24 hours in an icebox and filtered. There are obtained 375 g. of a product melting at 90° C. and consisting of the desired hydrazone diacetate.

The above diacetate is suspended in 4500 cc. of ethyl acetate and the mixture heated under reflux with agitation for one hour. 10 g. of carbon are added to the solution which is then filtered. It is allowed to cool slowly while agitating and the desired hydrazone monoacetate crystallizes out in an amount of 285 g. (yield 80% referred to the 5-nitro-furfural). M.P. 123–125° C. This substance is yellow and soluble in water, methanol and ethanol and practically insoluble in ethyl ether. For $$C_{12}H_{17}N_5O_4 \cdot CH_3COOH$$

Calculated (percent): C, 47.32; H, 5.96; N, 19.71. Found (percent): C, 47.57; H, 6.24; N, 19.85.

This product can be dried for 4 hours at 40° C. in an oven. At higher temperatures or when it is left in air for a long time, it loses acetic acid, while its melting point at first drops and finally rises to 167–168° C. which corresponds to a total transformation of the hydrazone into free base. The monoacetate can, however, be kept in a stoppered bottle indefinitely at 20–25° C.

In the mother liquors of the crystallization, one can recover an additional amount of the desired product by isolating it in the form of base or dihydrochloride. The base is obtained by extracting the mother liquors (ethyl acetate) with a small amount of water and precipitating the base by addition of a saturated solution of sodium carbonate to the aqueous extract. The precipitate is collected by filtration, dried in air and crystallized in ethyl acetate, leaving the soluble inorganic part. Yield: 10% of the theoretical yield. The dihydrochloride is obtained by acidification of the mother liquors of the crystallization by means of ethanolic HCl. Yield: 10% of the theoretical yield.

EXAMPLE 2

5-nitro-furfural 4'-methyl-piperazineacetohydrazone 172 g. (1 mol) of 4-methyl-piperazineacetohydrazide (prepared in the manner described in Example 1) are dissolved in 200 cc. of hot acetic acid, whereupon the solution is cooled to 20° C. and there are added, with agitation, 141 g. (1 mol) of 5-nitro-furfural dissolved in 100 cc. of acetic acid. The mixture is agitated at 40° C. for 1½ hours and then poured into 1000 cc. of ethyl acetate.

The solution is extracted with 4 successive portions of water of 1000, 500, 250 and 150 cc. It can be verified by chromatography that the ethyl acetate no longer contains any desired hydrazone. The aqueous extracts are combined and made alkaline with 2000 cc. of a 20% sodium carbonate solution. The desired hydrazone separates out in the form of crystalline base and after the solution has been set aside for one hour at 20° C., it is collected by filtration. The base thus obtained is dried and then crystallized in 3000 cc. of ethyl acetate, thus obtaining 250 g. (85% of the theoretical yield) of the desired product in base form. M.P. 167–168° C. This substances is yellow, soluble in methanol, ethanol, benzene, chloroform and acetone, slightly soluble in water and practically insoluble in ethyl ether. For $C_{12}H_{17}N_5O_4$.—Calculated (percent): C, 48.80; H, 5.80; N, 23.72. Found (percent): C, 48.72; H, 5.59; N, 23.74.

$$E_{1\,cm.}^{1\%} \text{ in } H_2O \begin{array}{l} \text{at } 360\,m\mu\,577 \\ \text{at } 250\,m\mu\,420 \end{array} \bigg| E_{1\,cm.}^{1\%} \text{ in } CH_3OH \begin{array}{l} \text{at } 360\,m\mu\,652 \\ \text{at } 250\,m\mu\,328 \end{array}$$

By dissolving the above base in ethyl alcohol and acidulating the solution by means of ethanolic HCl, the dihydrochloride of the above hydrazone is obtained in theoretical yield. M.P. 252° C. dec. This dihydrochloride is a yellow substance which is soluble in water and practically insoluble in alcohols, ethyl ether, benzene and ethyl acetate. For $C_{12}H_{17}N_5O_4 \cdot 2HCl$.—Calculated (percent): C, 39.14; H, 5.20; N, 19.46; Cl., 19.26. Found (percent): C, 39.41; H, 5.14; N, 19.18; Cl., 19.42.

In Table I there are set forth the properties of other 5-nitro-furfural piperazinealkanoyl hydrazones of Formula I which can be prepared in similar manner. The symbols R and X have the meaning previously indicated.

TABLE I

| R— | —X— | M.P. | Formula | Calculated | | | | Found | | | |
|---|---|---|---|---|---|---|---|---|---|---|---|
| | | | | C | H | N | Cl | C | H | N | Cl |
| CH₃—CH₂— | —CH₂— | 145–7 | C₁₃H₁₉N₅O₄·CH₃COOH | 48.77 | 6.28 | 18.96 | | 48.65 | 6.43 | 18.86 | |
| CH₃—CH₂—CH₂— | —CH₂— | 98–100 | C₁₄H₂₁N₅O₄·2CH₃COOH | 48.75 | 6.59 | 15.79 | | 48.98 | 6.60 | 16.10 | |
| CH₃—CH—<br>       \|<br>    CH₃— | —CH₂— | { 156<br>237–9 } | C₁₄H₂₁N₅O₄·H₂O·2HCl | { 52.00<br>{ 40.58 | 6.55<br>6.08 | 21.66<br>16.90 | <br>17.11 | 51.89<br>40.79 | 6.51<br>6.02 | 21.42<br>16.83 | <br>17.09 |
| CH₃—CH₂—CH₂—CH₂— | —CH₂— | { 158–9<br>226–7 } | C₁₅H₂₃N₅O₄·2HCl | { 53.40<br>{ 43.89 | 6.87<br>6.14 | 20.76<br>17.06 | <br>17.27 | 53.53<br>43.87 | 7.30<br>6.34 | 20.60<br>17.04 | <br>17.07 |
| CH₃—(CH₂)₁₁— | —CH₂— | 144–5 | C₂₃H₃₉N₅O₄ | 61.44 | 8.74 | 15.58 | | 61.46 | 8.47 | 15.75 | |
| 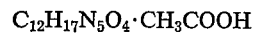—CH₂— | —CH₂— | { 200–1<br>185–7 } | C₁₈H₂₁N₅O₄·2HCl·2H₂O | { 58.21<br>{ 45.02 | 5.70<br>5.67 | 18.86<br>14.92 | <br>14.77 | 58.35<br>44.67 | 5.92<br>5.56 | 19.01<br>14.89 | <br>14.00 |
| C₂H₅<br>  \<br>   N—C—<br>  /  \|\|<br>C₂H₅  O | —CH₂— | 160–2 | C₁₉O₂₅N₆O₅ | 50.52 | 6.36 | 22.09 | | 50.63 | 6.51 | 21.89 | |

TABLE I—Continued

| R— | —X— | M.P. | Formula | Calculated C | H | N | Cl | Found C | H | N | Cl |
|---|---|---|---|---|---|---|---|---|---|---|---|
| C₆H₅— (phenyl) | —CH₂— | 200-1 | $C_{17}H_{19}N_5O_4 \cdot 2HCl$ | 57.13 | 5.36 | 19.60 | | 57.20 | 5.58 | 19.45 | |
| C₆H₅—CH₂—CH₂— | —CH₂— | { 166-8 <br> 239-40 } | $C_{19}H_{23}N_5O_4 \cdot 2HCl$ | { 59.21 <br> 49.79 | 6.02 <br> 5.49 | 18.17 <br> 15.28 | <br> 15.47 | 58.82 <br> 49.53 | 5.86 <br> 5.28 | 17.88 <br> 15.24 | <br> 14.94 |
| $CH_3$—CO— | —CH₂— | 193-5 | $C_{13}H_{17}N_5O_5$ | 48.29 | 5.30 | 21.66 | | 48.47 | 5.59 | 21.58 | |
| HO—CH₂—CH₂— | —CH₂— | 181-3 | $C_{13}H_{19}N_5O_5$ | 47.99 | 5.89 | 21.53 | | 48.33 | 5.54 | 21.64 | |
| H— | —CH₂— | 269-71 | $C_{11}H_{15}N_5O_4 \cdot 2HCl$ | 37.30 | 4.83 | 19.77 | | 37.41 | 4.91 | 19.52 | |
| O₂N—C₆H₄— | —CH₂— | 229-30 | $C_{17}H_{18}N_6O_6$ | 50.74 | 4.51 | 20.89 | | 51.06 | 4.52 | 20.42 | |
| $CH_3$— | —CH(CH₃)— | 117-9 <br> 212-4 | $C_{13}H_{19}N_5O_4 \cdot 2H_2O \cdot 2HCl \cdot H_2O$ | { 45.21 <br> 39.00 | 6.71 <br> 5.79 | 20.28 <br> 17.50 | <br> 17.71 | 45.59 <br> 39.37 | 7.20 <br> 5.58 | 20.17 <br> 17.44 | <br> 17.68 |
| $CH_3$— | —CH₂—CH₂— | 135-7 | $C_{13}H_{19}N_5O_4 \cdot H_2O$ | 47.70 | 6.47 | 21.40 | | 47.95 | 6.38 | 21.58 | |
| $CH_3$—C(CH₃)=CH—CH₂—CH₂—CH(CH₃)—CH₂—CH₂— | —CH₂— | { 139-141 <br> 140(dec.) } | $C_{21}H_{33}N_5O_4$ <br> $\cdot 2HNO_3$ | { 60.12 <br> 46.23 | 7.93 <br> 6.46 | 16.70 <br> 17.79 | | 59.59 <br> 46.05 | 8.05 <br> 6.60 | 16.39 <br> 17.55 | |

The characteristics of intermediate hydrazides are given in Table II. The symbols R and X have the meaning previously indicated.

TABLE II

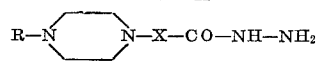

R—N⟨ ⟩N—X—CO—NH—NH₂

| R— | —X— | M.P. | B.P. | Formula | Calculated C | H | N | Found C | H | N |
|---|---|---|---|---|---|---|---|---|---|---|
| CH₃—CH₂— | —CH₂— | 73-4 | | $C_8H_{18}N_4O$ | 51.58 | 9.74 | 30.08 | 51.57 | 9.95 | 29.60 |
| CH₃—CH₂—CH₂— | —CH₂— | 96-8 | | $C_9H_{20}N_4O$ | 53.97 | 10.07 | 27.98 | 53.69 | 10.22 | 27.51 |
| CH₃—CH(CH₃)— | —CH₂— | 75-6 | 141/05 mm. Hg | $C_9H_{20}N_4O$ | 53.97 | 10.07 | 27.98 | 53.64 | 9.80 | 27.54 |
| CH₃—(CH₂)₃— | —CH₂— | 75-6 | | $C_{10}H_{22}N_4O$ | 56.04 | 10.35 | 26.15 | 56.48 | 10.27 | 26.43 |
| CH₃—(CH₂)₁₁— | —CH₂— | 85-6 | | $C_{18}H_{38}N_4O$ | 76.21 | 11.73 | 17.16 | 76.17 | 11.89 | 17.15 |
| C₆H₅—CH₂— | —CH₂— | 103-4 | 164/0.4 mm. Hg | $C_{13}H_{20}N_4O$ | 62-87 | 8.12 | 22.56 | 62.92 | 8.52 | 22.95 |
| (C₂H₅)₂N—CO— | —CH₂— | 80-1 | | $C_{11}H_{23}N_5O_2$ | 51.34 | 9.01 | 27.22 | 51.34 | 9.39 | 27.15 |
| CH₃CO— | —CH₂— | 105-6 | | $C_8H_{16}N_4O_2$ | 47.98 | 8.05 | 27.98 | 47.92 | 8.16 | 27.73 |
| C₆H₅—CH₂—CH₂— | —CH₂— | 143-5 | | $C_{14}H_{22}N_4O$ | 64.09 | 8.45 | 21.36 | 63.98 | 18.65 | 21.00 |
| O₂N—C₆H₄— | —CH₂— | 165-7 | | $C_{12}H_{17}N_5O_3$ | 51.60 | 6.14 | 25.08 | 51.85 | 6.33 | 25.10 |
| H— | —CH₂— | 167-9 | 147/0.2 mm. Hg | $C_6H_{14}N_4O \cdot 3HCl \cdot H_2O$ ᵃ | 25.23 | 6.70 | 19.62 | 25.61 | 6.92 | 19.20 |
| CH₃— | —CH(CH₃)— | | 127/0.4 mm. Hg | $C_8H_{18}N_4O$ | 51.58 | 9.74 | 30.08 | 51.56 | 9.74 | 29.91 |
| CH₃— | —CH₂CH₂— | 203-5 <br> 78-9 | <br> 145/0.8 mm. Hg | $C_8H_{18}N_4O \cdot 3HCl \cdot H_2O$ <br> $C_8H_{18}N_4O$ | 30.63 | 7.39 | 17.86 | 30.60 | 7.60 | 18.30 |

ᵃ Percent Cl. Calculated, 37.24; Found, 37.11.

The characteristics of certain starting piperazine-alkanoic esters are given in Table III. The symbols R and and X have the meaning previously indicated.

TABLE III $$R-N\diagup\phantom{XX}\diagdown N-X-COOC_2H_5$$

| R— | —X— | M.P. | B.P. | Formula | Calculated C | H | N | Cl | Found C | H | N | Cl |
|---|---|---|---|---|---|---|---|---|---|---|---|---|
| $CH_3CH_2$— | —$CH_2$— | | 137/22 mm. Hg | $C_{10}H_{20}N_2O_2$ | 59.97 | 10.07 | 13.99 | | 59.78 | 9.84 | 14.23 | |
| $CH_3CH_2CH_2$— | —$CH_2$— | 178–9 | 136–7/18 mm. Hg | $C_{11}H_{22}N_2O_2 \cdot 2HCl$ | {61.65 / 45.99 | 10.35 / 8.42 | 13.07 / 9.75 | / 24.69 | 61.56 / 46.08 | 10.38 / 8.37 | 13.09 / 9.66 | / 24.50 |
| $CH_3-CH-$<br>$\phantom{XX}\|$<br>$\phantom{XX}CH_3$ | —$CH_2$— | 203–4 | 137/15 mm. Hg | $C_{11}H_{22}N_2O_2 \cdot 2HCl$ | 45.99 | 8.42 | 9.75 | 24.69 | 46.06 | 8.67 | 9.84 | 24.52 |
| $CH_3-(CH_2)_3-$ | —$CH_2$— | 197–9 | 144–5/12 mm. Hg | $C_{12}H_{24}N_2O_2 \cdot 2HCl$ | {63.12 / 47.84 | 10.60 / 8.70 | 12.26 / 9.30 | / 23.54 | 62.85 / 47.40 | 11.42 / 9.18 | 12.43 / 9.16 | / 23.40 |
| $CH_3-(CH_2)_1-$ | —$CH_2$— | | 160–1/0.2 mm. Hg | $C_{20}H_{40}N_2O_2$ | 70.50 | 11.84 | 8.23 | | 70.95 | 11.77 | 8.40 | |
| ⌬—$CH_2-CH_2-$ | —$CH_2$— | 215–17 | 147/0.3 mm. Hg | $C_{16}H_{24}N_2O_2 \cdot 2HCl$ | {69.43 / 55.01 | 8.75 / 7.50 | 10.14 / 8.02 | / 20.30 | 69.45 / 54.74 | 8.86 / 7.56 | 10.33 / 8.03 | / 19.98 |
| $O_2N-$⌬— | —$CH_2$— | 122–3 | | $C_{14}H_{19}N_3O_4$ | 57.32 | 6.53 | 14.33 | | 57.43 | 6.55 | 14.37 | |
| $CH_3CO-$ | —$CH_2$— | {40–42 / 164–66} | 125/0.1 mm. Hg | $C_{10}H_{18}N_2O_3 \cdot HCl$ | 47.90 | 7.64 | 11.17 | 14.14 | 48.17 | 7.85 | 11.33 | 14.04 |
| $C_2H_5\diagdown$<br>$\phantom{XX}N-C-$<br>$C_2H_5\diagup\phantom{X}\|$<br>$\phantom{XXXX}O$ | —$CH_2$— | 136–7 | 138/0.5 mm. Hg | $C_{13}H_{25}N_3O_3 \cdot HCl$ | {57.54 / 50.75 | 9.29 / 8.51 | 15.49 / 13.66 | / 11.52 | 57.65 / 50.54 | 9.71 / 8.30 | 15.60 / 13.55 | / 11.48 |
| $CH_3-$ | —$CH-$<br>$\phantom{XX}\|$<br>$\phantom{XX}CH_3$ | | 116/10 mm. Hg | $C_{10}H_{20}N_2O_2$ | 59.97 | 10.07 | 13.99 | | 60.04 | 10.35 | 14.00 | |

The antibacterial activity of some of the 5-nitro-furfural piperazinealkanoyl hydrazones obtained by the present invention was determined on the following microorganisms: *Escherichia coli* 100, *Salmonella typhimurium* 1090, *Proteus vulgaris* OX, *Micrococcus pyogenes* SG511, *Bacillus subtilis* ATCC 9466, cultivated in Difco nutrient agar, on *Streptococcus pyogenes* A88 cultivated in the Difco agar "brain heart infusion agar" containing an addition of 5% defibrinated guinea pig blood, and on *Clostridium novyi* cultivated in Difco thioglycolated liquid medium. The results were read after incubation for 18 hours at 35–37° C.

These compounds were also tested against *Mycobacterium tuberculosis* H37 Re cultivated on the Kirchner-Hermann medium in the presence of 10% beef serum. The readings were effected after 10, 17 and 24 days.

Table IV below gives the minimum active concentrations expressed in μg./ml. of the compounds tested. The symbols R and X have the meaning previously indicated.

observed within 7 days following the administration of individual doses of the substances in question.

The $DL_{50}$ values are set forth in Table V.

TABLE V
[$DL_{50}$ and slopes (S) of the mortality lines]

| Animal | No. | Manner of administration | $DL_{50}$ and its reliability limits α=0.05 mg./kg. | S and its reliability limits α=0.05 |
|---|---|---|---|---|
| Mice | 160 | Oral | 1,350 (1,195–1,526) | 1.41 (1.23–1.63) |
| | 80 | Subcutaneous | 345 (303–393) | 1.24 (1.13–1.37) |
| | 60 | Intraperitoneal | 315 (300–330) | 1.08 (0.95–1.23) |
| | 60 | Intraveneous | 355 (323–391) | 1.22 (1.11–1.35) |
| Rats | 55 | Oral | 1,200 (1,130–1,270) | 1.07 (0.93–1.24) |
| | 120 | Intraveneous | 2,400 (2,034–2,832) | 1.46 (1.22 1.75) |

(2) Antibacterial activity in vivo

There were used for the experiments NMRI white mice and Wistar white rats of both sexes. The mice had a body weight of 18–20 g. and the rats 200–250 g.

TABLE IV

| R— | —X— | *E. coli* | *S. thypi-murium* | *Proteus vulgaris* | *M. pyogenes* | *S. pyogenes* | *B. subtilis* | *C. novyi* | *M. tuberculosis* |
|---|---|---|---|---|---|---|---|---|---|
| $CH_3$— | —$CH_2$— | 40 | 40 | 80 | 20 | 2.5 | 20 | 160 | |
| $CH_3$— | —$CH_2-CH_2$— | 20 | 40 | | 10 | 20 | 10 | 160 | 10 |
| $CH_3$— | —$CH-$<br>$\phantom{X}\|$<br>$\phantom{X}CH_3$ | 10 | 40 | 40 | 10 | 40 | 5 | 80 | 80 |
| $C_2H_5$— | —$CH_2$— | 10 | 10 | 40 | 5 | 10 | 5 | 160 | 40 |
| $C_3H_7n$— | —$CH_2$— | 20 | 20 | 80 | 5 | 20 | 5 | 40 | 20 |
| $(CH_3)_2CH$— | —$CH_2$— | 10 | 20 | 80 | 5 | 10 | 5 | 160 | 10 |
| $C_4H_9n$— | —$CH_2$— | 10 | 40 | 80 | 10 | 40 | 5 | 40 | 320 |
| $C_6H_5-CH_2$— | —$CH_2$— | 40 | 160 | | 10 | 2.5 | 5 | 80 | 20 |
| $C_6H_5$— | —$CH_2$— | 80 | 80 | 80 | 20 | 40 | 5 | 40 | 40 |
| $CH_3CO$— | —$CH_2$— | 20 | 80 | 160 | 10 | 5 | 20 | | 40 |
| $(C_2H_5)_2NCO$— | —$CH_2$— | 80 | | | 10 | 5 | 10 | 80 | 40 |

Additional tests using 5-nitro-furfural-4'-methylpiperazinoacethydrazine were conducted as follows:

(1) Acute toxicity ($DL_{50}$) determined on mice and rats

The $DL_{50}$ was determined by administering the compound to animals of both sexes, which had fasted for about 14 hours.

There were used NMRI white mice and Wistar white rats.

The $DL_{50}$ values were calculated by the method of Litchfield and Wilcoxon (1949) on basis of the mortality (a) Activity on experimental peritonitis from *Klebsiella pneumoniae*.—Groups of 20 mice were infected intraperitoneally with a charge of *Klebsiella pneumoniae* which caused the death of the animals by peritonitis within 48 hours from the infection. The treatment was carried out by administering the drug in question by stomach tube in a dose of 0.25 mM./kg. one hour before and one and a half hours after injection of the infecting microorganism and then once a day for 5 consecutive days. As control, there was infected a group of mice to which there was administered the same volume of vehicle in place of 5 - nitro-furfural-4'-methyl-piperazinoacethydrazone. The mortality of the animals within 7 days following the infection was obserbed.

The results are set forth in Table VI, from which it appears that the treatment with 5-nitro-furfural-4'-methyl-piperazinoacethydrazone resulted in a clear protective action, since the animals treated all died at a time later than the controls.

(d) Activity of 5 - nitro-furfural-4'-methyl-piperazinoacethydrazone of the urinary track with *Proteus vulgaris* O.—Infection of the urinary tract was caused by the method described by Hossack (1962) on female rats of a body weight of 200–250 g.

The infection was effected in the bladder with a small zinc plate of 3 x 3 x 1 mm. which had been previously immersed in a culture of *Proteus vulgaris* O for 24 hours TABLE VI.—EXPERIMENTAL PERITONITIS FROM *Klebsiella pneumoniae*

| Compound | No. of mice | Mortality after— | | | | | Total mortality |
| --- | --- | --- | --- | --- | --- | --- | --- |
| | | 18 hrs. | 20 hrs. | 24 hrs. | 2 days | 3 days | |
| Controls | 20 | 9 | 5 | 2 | 4 | | 20 |
| 5-nitrofurfural-4'-methyl-piperazinoacethydrazone | 20 | 10 | 1 | 3 | 3 | 2 | 19 |

(b) Activity of 5 - nitro-furfural-4'-methyl-piperazinoacethydrazone on experimental septicemia from *Streptococcus haemolyticus* 203.—Groups of 10 mice were infected intraperitoneally with a charge of *Streptococcus haemolyticus* which caused the death by sepsis of the animals within 48 hours from the infection. The treatment was carried out by administering the drug in a dose of 0.25 mM./kg. by stomach tube immediately after the infection and thereupon once a day for 3 consecutive days.

As control, there was infected a group of mice which was administered the same volume of vehicle instead of 5 - nitro-furfural-4'-methyl-piperazinoacethydrazone. The mortality within 8 days from the infection was noted.

5 - nitro - furfural - 4'-methyl-piperazinoacethydrazone exerts a statistically very significant protection with respect to infection from *Streptococcus haemolyticus* (Table VII).

at 37° C. in Difco nutrient broth. There was used the 2G/4 strain isolated from urine obtained from subjects affected by pyelonephritis. The treatment was initiated on the fourth day after the infection, the 5-nitro-furfural-4'-methyl-piperazinoacethydrazone being administered by stomach tube in a dose of 50 mg./kg. dissolved in water in an amount of 10 ml./kg. body weight. The treatment was carried out daily for 36 consecutive days. One group of control rats (infected controls) was treated in the manner described above, but instead of the 5-nitro-furfural-4'-methyl-piperazinoacethydrazone they received an administration of an equal volume of water. To another group of rats (non-infected controls), the sterile plate was introduced into the bladder. Fifteen rats were used for the group treated with 5-nitro-furfural-4'-methyl-piperazinoacethydrazone and 14 rats for each control group.

TABLE VII.—EXPERIMENTAL INFECTION WITH *Streptococcus haemolyticus* 203

| Compounds | Dose, mM./kg. | No. of mice | Mortality after time in days | | | | Total mortality |
| --- | --- | --- | --- | --- | --- | --- | --- |
| | | | 1 | 2 | 3 | 8 | |
| Controls | | 10 | 3 | 6 | 1 | | 10 |
| 5-nitrofurfural-4'-methyl-piperazinoacethydrazone | 0.25 | 10 | | 1 | 1 | | 2 |

(c) Activity of 5 - nitro-furfural-4'-methyl-piperazinoacethydrazone on experimental septicemia from *Salmonella typhimurium* 1086.—Groups of 10 mice were infected intraperitoneally with a charge of *Salmonella typhimurium* 1086 such as to cause the death of the animals within 3 days from the infection. The treatment was carried out by administering the drug in a dose of 0.25 mM./kg. by stomach tube one hour before and one and a half hours after the infection and then once a day for three consecutive days. As control, there was infected a group of mice to which, instead of the 5-nitro-furfural-4'-methyl-piperazinoacethydrazone there was administered an equal amount of vehicle alone. The mortality of the treated animals was noted during the six days after the infection and compared with that found for the control animals during the same period of time.

The results of the experiments are summarized in Table VIII, from which it can be noted that 5-nitro-furfural-4'-methyl-piperazinoacethydrazone lengthened the time of survival of 50% of the animals (ET 50) in statistically significant manner as compared with the controls.

During theperiod of the experiment, 5 infected control animals died (1 on the 2nd day, 3 on the 14th day, and 1 on the 36th day of the treatment). A single treated rat died on the 15th day, while none of the non-infected control animals died during the time of the experiment. The percentage of the animals which died during the treatment was 36% in the case of the infected controls, while in the case of the animals treated with 5-nitro-furfural - 4'-methylpiperazinoacethydrazone it was 7% (Table IX).

TABLE IX.—EXPERIMENTAL INFECTION BY *Proteus vulgaris* O, SURVIVAL OF ANIMALS

| | Infected controls | 5-nitro-furfural-4'-methyl-piperazino-acethydrazone |
| --- | --- | --- |
| Dead | 5 | 1 |
| Alive | 9 | 14 |

TABLE VIII.—EXPERIMENTAL INFECTION BY *Salmonella typhimurium* 1086, TREATMENT

| Compounds | No. of animals | Mortality after— | | | | | | | Total mortality |
| --- | --- | --- | --- | --- | --- | --- | --- | --- | --- |
| | | 18 hrs. | 1 day | 2 days | 3 days | 4 days | 5 days | 6 days | |
| Controls | 10 | 6 | 2 | 1 | 1 | | | | 10 |
| 5-nitrofurfural-4'-methyl-piperazinoacethydrazone | 10 | | | 2 | 6 | 1 | 1 | | |

(3) Therapeutic indications.—Infections of the urinary tract.

Dose.—50–200 mg. 2–4 times per day by mouth or 100 mg. slowly i.v.

What is claimed is:
1. 5-nitro-furfural-piperazinohydrazone of the formula

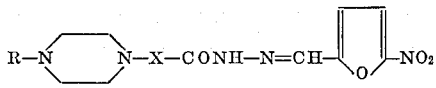

wherein:
R is hydrogen, an alkyl radical having 1 to 12 carbon atoms, an alkenyl radical having 1 to 12 carbon atoms, a phenyl radical, a benzyl radical, a phenylethyl radical, a nitrophenyl radical, a hydroxyethyl radical, an acetyl radical or a lower dialkyl carbamoyl radical, and
X is a methylene, ethylene or ethylidene group.

2. The compound according to claim 1, wherein R is an alkyl radical of 1 to 4 carbon atoms, a phenyl radical, a benzyl radical, an acetyl radical or an N-diethyl-carbamoyl radical.

3. 5-nitro-furfural-4'-methyl-piperazinoacethydrazone.

References Cited
UNITED STATES PATENTS 3,304,303   2/1967   Schmidt et al. _____ 260—247.1

OTHER REFERENCES

Chemical Abstracts, vol. 62, col. 14,672 (1965) (abstract of Chen et al.).

Wagner-Zook, Synthetic Organic Chemistry, p. 667, John Wiley and Sons, Inc. (1953).

JOHN D. RANDOLPH, Primary Examiner

U.S. Cl. X.R.

260—268; 424—250